June 23, 1959   C. W. MacMILLAN   2,891,404
BALANCE TESTING DEVICE FOR ROTATING BODIES
Filed Jan. 11, 1957   5 Sheets-Sheet 2

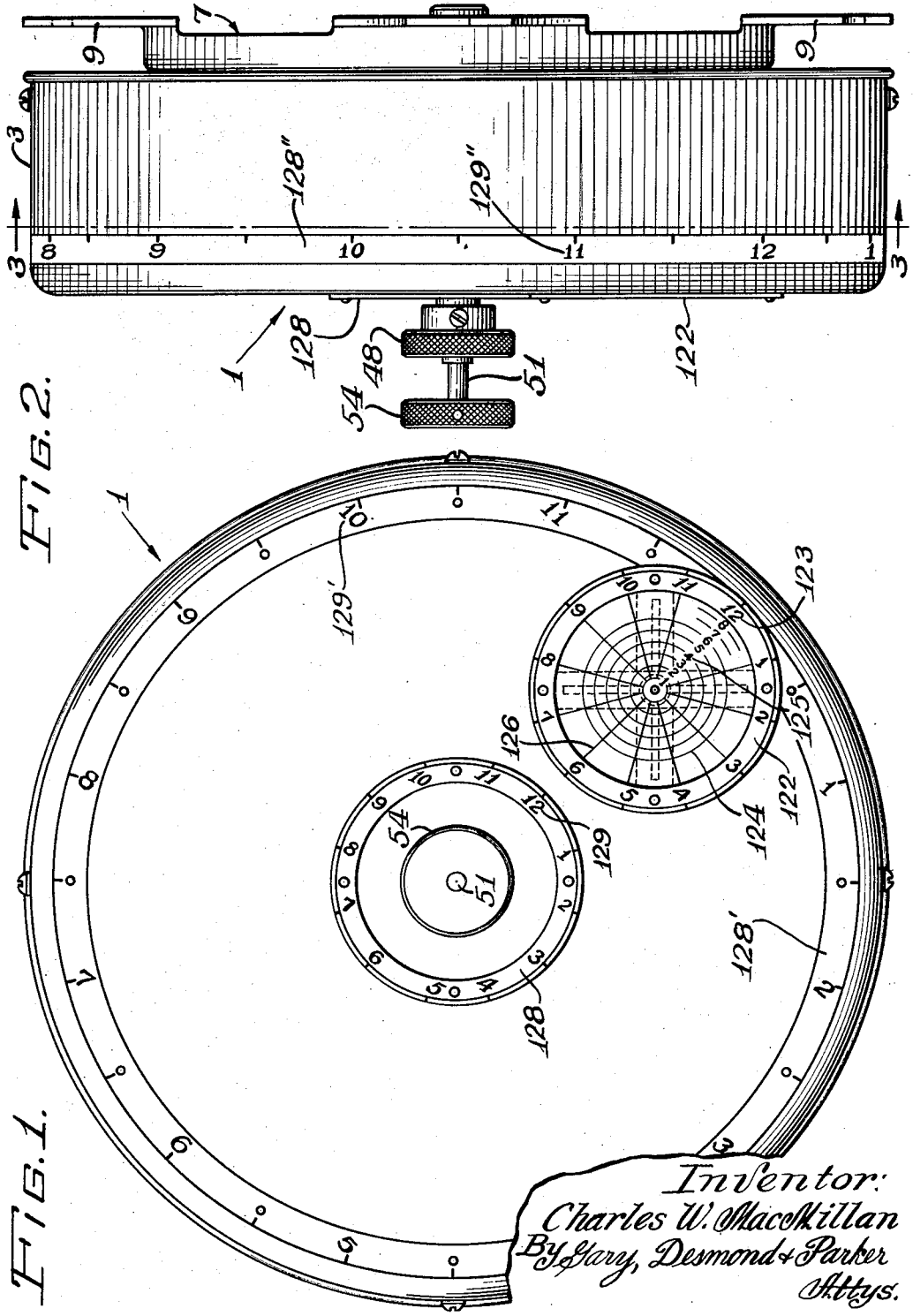

Inventor:
Charles W. MacMillan
By Mary, Desmond & Parker
Attys.

June 23, 1959  C. W. MacMILLAN  2,891,404
BALANCE TESTING DEVICE FOR ROTATING BODIES
Filed Jan. 11, 1957  5 Sheets-Sheet 4

Inventor:
Charles W. MacMillan
By Gary, Desmond & Parker
Attys.

June 23, 1959  C. W. MacMILLAN  2,891,404
BALANCE TESTING DEVICE FOR ROTATING BODIES
Filed Jan. 11, 1957  5 Sheets-Sheet 5

Inventor:
Charles W. MacMillan
By Gary, Desmond & Parker
Attys.

United States Patent Office 2,891,404
Patented June 23, 1959

2,891,404
BALANCE TESTING DEVICE FOR ROTATING BODIES

Charles W. MacMillan, Rock Island, Ill., assignor to Bear Manufacturing Company, Rock Island, Ill., a corporation of Delaware Application January 11, 1957, Serial No. 633,775

11 Claims. (Cl. 73—458)

This invention relates to improvements in a device for testing the static and dynamic balance of rotating bodies, and refers particularly to a balance testing device for testing the balance of a wheel of an automotive vehicle while the wheel remains on the vehicle.

Balance testing devices which test the condition of balance of automobile wheels where the wheels remain on the automobile have heretofore been proposed. However, prior proposed devices employed for the purpose described are intricate and are expensive to manufacture and difficult to service.

The device comprising the present invention is characterized by its simplicity in construction and operation and directly indicates the position and the degree of unbalance of an unbalanced wheel.

The objects, advantages and features of the present invention will be apparent from the accompanying drawings and following detailed description.

In the drawings,

Fig. 1 is a front elevational view of a device embodying the concept of the present invention.

Fig. 2 is a side elevational view of the device shown in Fig. 1.

Figure 3:
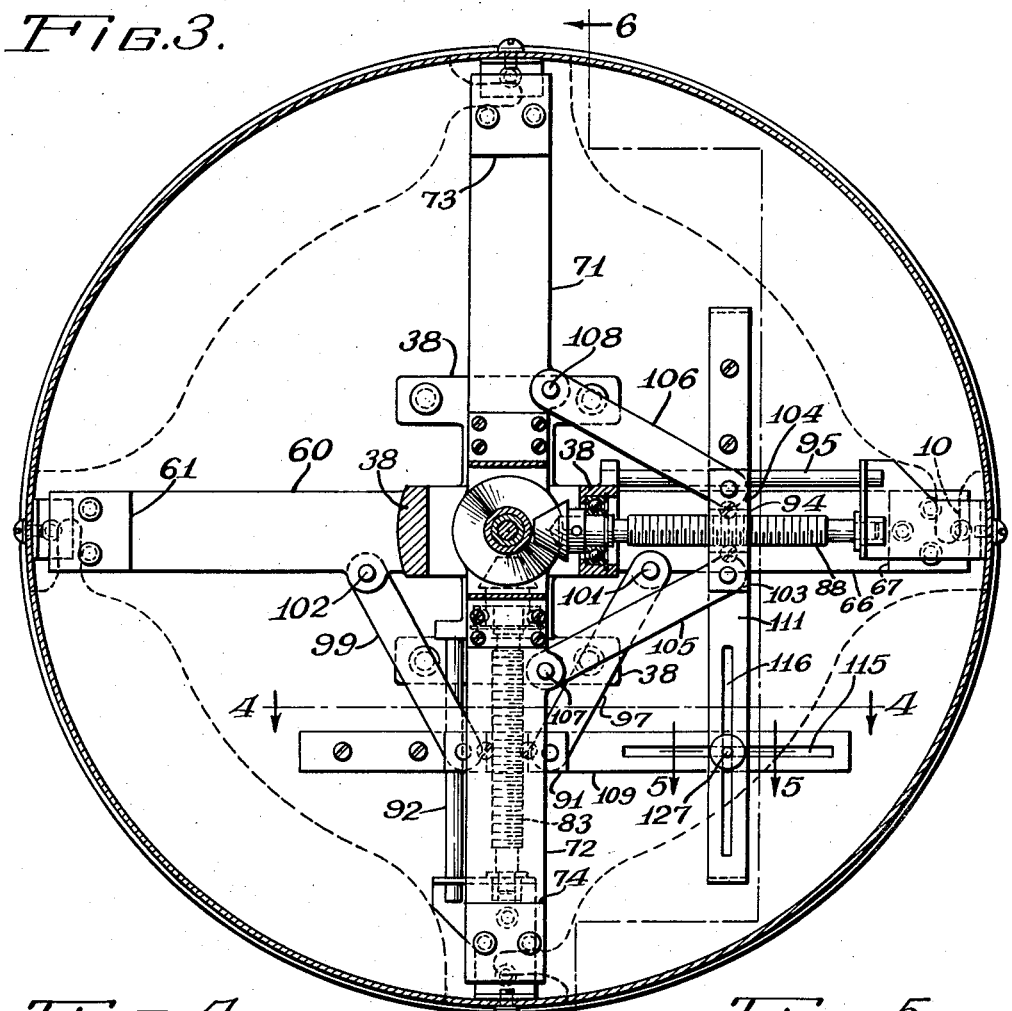
Fig. 3 is a front elevational view of the device with the front face thereof removed.

Referring in detail to the drawings, 1 indicates generally the balance testing device embodying the concept of the present invention. The device 1 comprises a substantially disc shaped base plate 2 upon which is mounted a pan-shaped cover 3. The cover 3 is secured to the base plate 2 by means of screws 4 which engage with flange members 5 which are secured to the base plate by means of rivets or the like 6. A securing member 7 is fastened to the opposite face of the base plate by means of rivets 8 or the like, the securing member having radially projecting arms 9 which are offset from the plane of the base plate. Each arm 9 is provided with an open slot 10 whereby the arms may be brought into engagement with an adapter 11, the construction of which will be hereinafter more fully described.

Figure 6:
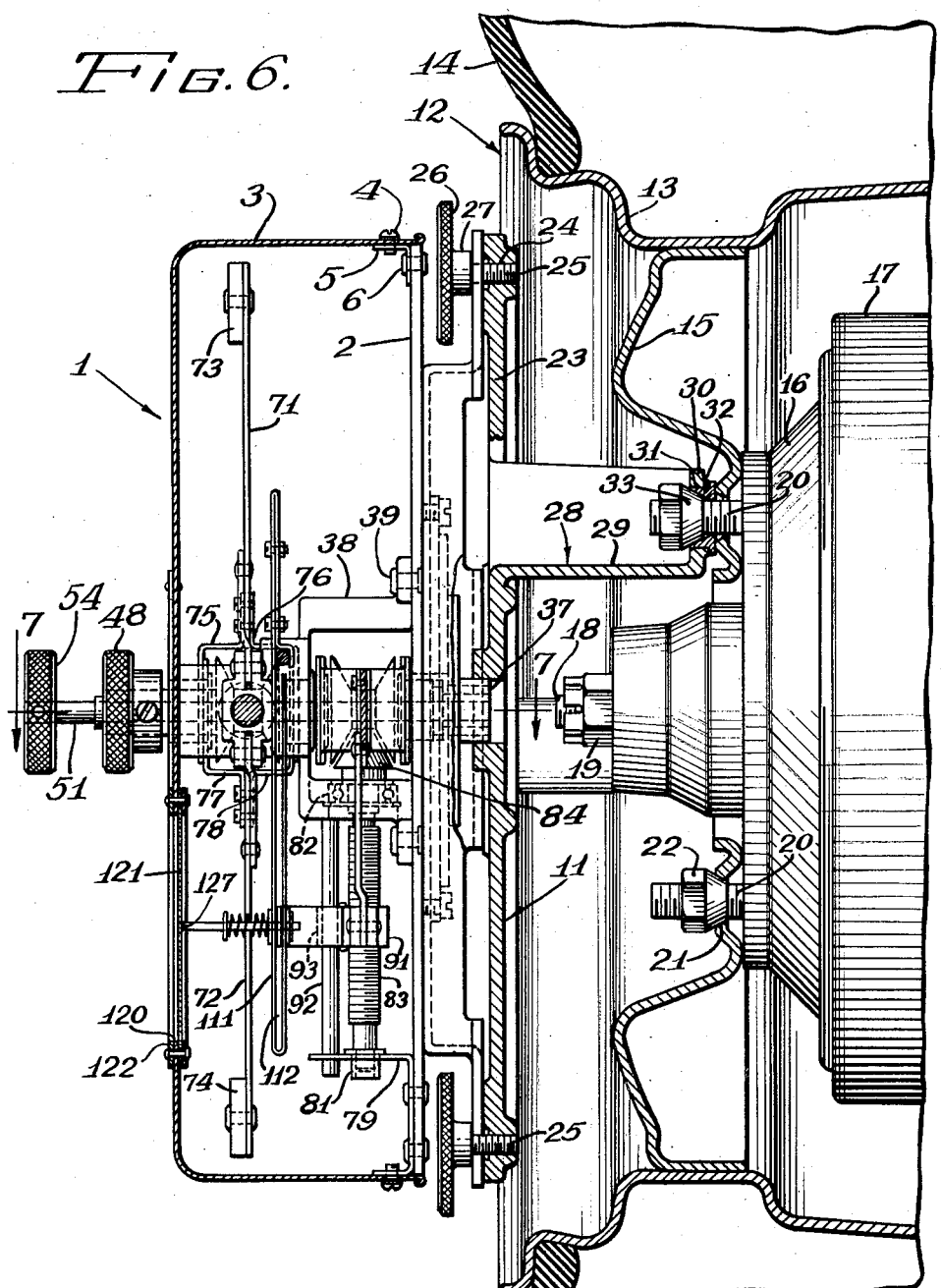
Fig. 6 is a vertical sectional view of the device taken on line 6—6 of Fig. 3, showing the device mounted upon a conventional automobile wheel.

Referring particularly to Fig. 6, the testing device 1 is adapted to be secured to an automobile wheel in coaxial relationship thereto and with the base plate 2 in substantially plane parallel relationship to the general plane of the wheel. 12 indicates generally a conventional automobile wheel having a rim portion 13 upon which tire 14 is mounted and having a disc or web portion 15 which is adapted for securement to bearing portion 16 of the wheel, that is, the portion which carries brake drum 17 and which is fastened to wheel spindle 18 by means of nut 19. The bearing portion 16 of the wheel 12 carries a plurality of studs 20 which are angularly spaced upon a stud bolt circle. The disc or web portion 15 of the wheel is provided with apertures 21 through which the studs 20 extend and lock nuts 22 normally secure the web or disc portion 15 of the wheel to the bearing portion 16.

As a convenient means of mounting the test device 1 upon the wheel 12, the stud bolts 20 are used. However, in view of the fact that said studs are in a recessed portion of the wheel, an adapter 11 is used to conveniently secure the test device to said studs.

The adapter 11 comprises essentially a plate or disc portion 23, the peripheral portion thereof being provided with a plurality of threaded apertures 24 to receive screws 25. The screws 25 at their outer ends carry knobs or hand wheels 26 whereby they may be conveniently manipulated in the apertures 24 and each of said hand wheels or knobs carry a boss 27 between which and the peripheral portion of the plate 23, the arms 9 may be positioned, the screws 25 being positioned within the open slots 10. Thus, the arms 9, and hence the base 2 of the test device may be secured to the adapter 11.

The adapter 11 also carries a plurality of circumferentially spaced connecting elements 28, each of said elements 28 comprising a semi-cylindrical or semi-tubular sleeve 29 and each of the sleeves 29 terminates in a flange 30. The flanges 30 are each provided with apertures 31 through which the studs 20 may extend, the apertures 31 being relatively enlarged in diameter relative to the studs 20 whereby to receive centering inserts 32. One surface of each of the inserts is conically tapered to register with the tapered surface 33 of the nuts 22 whereby the flanges 30 may be secured and centered upon the respective studs 20.

Conventional automobile wheels usually have four, five or six studs 20 and depending upon the size of the wheel the stud bolt circle may have a greater or lesser radius. Hence, when employing the test device 1, a plurality of adapters 11 must be available to the one performing the service whereby the test device may be securely mounted upon any of a relatively large number of wheels having different stud bolt characteristics.

A disc like member 34 is secured to the face of the element 7 by means of screws 35 or the like and at the central portion of the member 34 a tubular collar 36 is carried. The adapter plate 23 is provided with a central aperture 37 which is adapted to receive the collar 36 when the test device 1 is mounted upon the adapter thereby coaxially centering the test device upon the adapter.

To accommodate the adapters 11 to wheels having different numbers of studs 20, each adapter may carry a different number of connecting elements 28. For example, if the wheel has six studs, the adapter will carry three equally spaced connecting elements and the connecting elements will engage with alternate studs. If the wheel has five studs, the adapter has three unequally spaced connecting elements engageable with three of the five studs, and if the wheel has four studs, the adapter carries four appropriately spaced connecting elements, one for each stud. In all cases, the adapters are substantially balanced both statically and dynamically so as not to contribute to the normal balanced or unbalanced condition of the wheel.

A frame member 38 is mounted upon the base plate 2, being secured thereto by rivets 39, or the like. The frame member extends transversely within the cover 3 and at its opposite end it is secured to a bridging plate 40 which is secured thereto by screws 41.

A bearing 42 is carried by the bridging plate 40, said bearing having a flange 43 at its inner end and being engageable with a locking ring 44 intermediate its length whereby the bearing is held in place against axial displacement. A sleeve 45 is journaled in the bearing 42, said sleeve adjacent its inner end carrying a spool 46 having opposite conically tapered surfaces 47. The opposite end portion of sleeve 45 projects outwardly from the cover 2, and a control knob 48 is secured to the projecting sleeve by means of set screws 49.

A second or inner sleeve 50 is rotatably positioned within sleeve 45. The inner sleeve 50 functions as a front bearing for a shaft 51 which is journaled at its rear end in bearing 52 carried within a collar 53 which, in turn, is supported by collar 36. A second control knob 54 is secured to the front end of shaft 51 which projects from sleeve 50 and the front of the cover 3. Within the cover 3 adjacent the base plate 2, shaft 51 carries spool 55 which is secured thereto by pin 56. The spool 55, like spool 46, carries opposed conically tapered surfaces 57.

Figure 7:
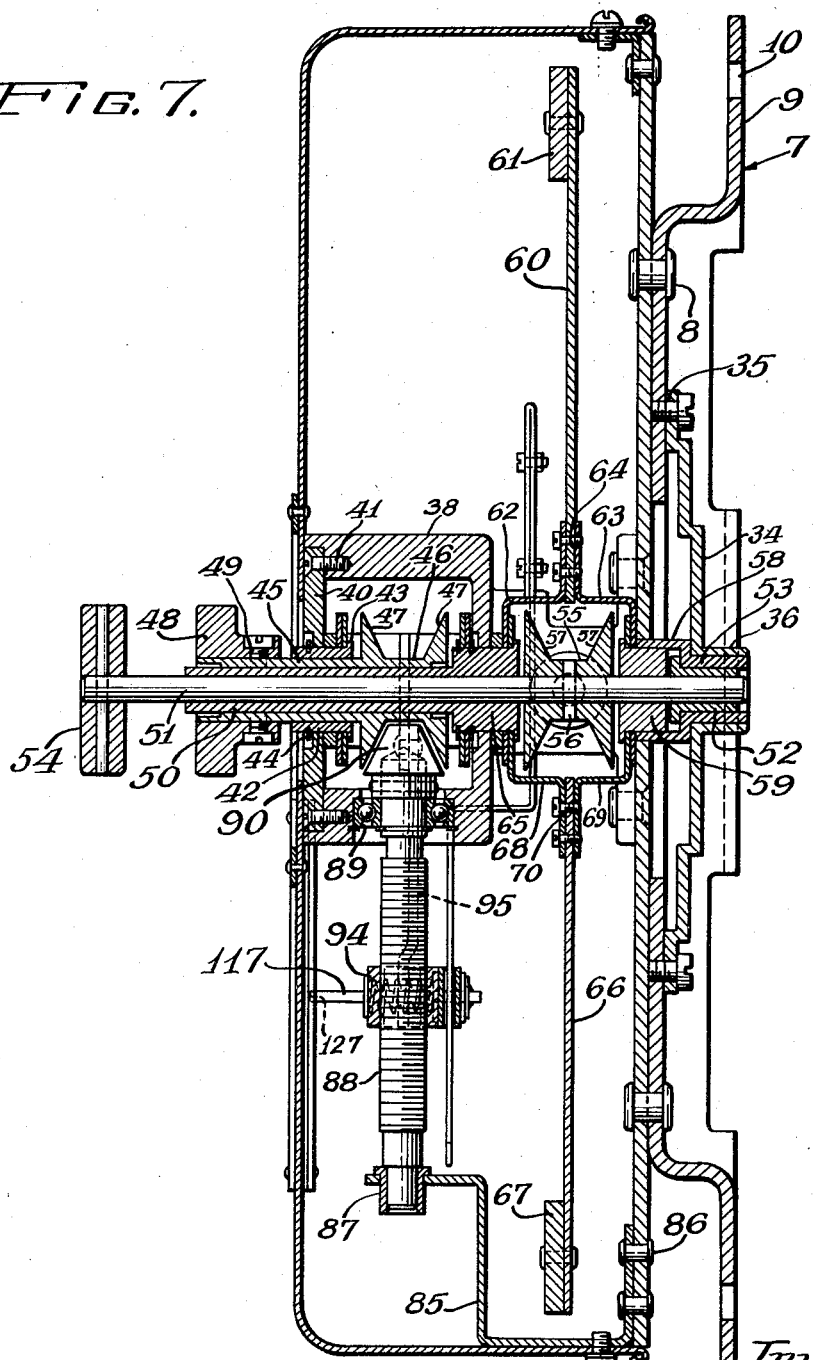
Fig. 7 is a horizontal sectional view of the device taken on line 7—7 of Fig. 6.

Collar 53 is of enlarged diameter within plate 34, as shown best at 58 in Fig. 7 and within said enlarged portion, a bushing 59 is carried. A weight arm 60, carrying at its end a weight 61 is secured to opposite bifurcated journal members 62 and 63 by screws 64. The bifurcated members 62 and 63 embrace or span spool 55 and are journaled respectively upon an enlarged portion 65 of sleeve 50, and bushing 59. In similar fashion a weight arm 66 carries a weight 67 at its outer end and at its inner end is secured to bifurcated arms 68 and 69 by means of screws 70. The bifurcated arms 68 and 69 also span spool 55 and are journaled respectively on the enlarged portion 65 of sleeve 50, and on bushing 59.

The arrangement is such that both arms 60 and 66 swing within the cover 3, that is, they rotate about the bushings 65 and 59 during the operation of the device. As will be hereinafter more fully described, the arms 60 and 66 move together, but in opposite angular directions.

Referring particularly to Fig. 6, a pair of weight arms 71 and 72, respectively, carrying weights 73 and 74, are positioned within the casing. Similar to weight arms 60 and 66, arms 71 and 72, respectively, terminate in bifurcated members 75 and 76 and 77 and 78 which are journaled on the exterior surfaces of bearing 42, and upon sleeve 65. Arms 71 and 72 are normally transverse to arms 60 and 66 and like the latter arms, the arms 71 and 72 rotate together within the casing, but in opposite angular directions.

A bracket 79 is secured to base plate 2 by means of rivets or the like, said bracket extending transversely to the base plate and carrying a bearing 81. Frame member 38 carries a ball bearing assembly 82 which is in alignment with the bearing 81. A screw 83 is journaled at one end in bearing 81 and adjacent its opposite end said screw is journaled in the ball bearing assembly 82. A conical head 84 is carried by the end of screw 83 and is normally positioned between and spaced from each of the surfaces 57 of spool 55.

As will be hereinafter more fully described, when the wheel 12 is rotated in being subjected to a balance test, base plate 2 and the entire mechanism comprising the balancer rotates therewith. The shaft 51 is axially movable in the bearing 52 and sleeves 50 and 59 and hence, said shaft may be moved so as to engage one or the other of the surfaces 57 with the conical head 84. To move the shaft 51 axially, the knob 54 may be grasped and held by an operator and the shaft, while so being held, may be shifted inwardly or outwardly to cause the engagement of the spool 55 surface and the head 84. However, with the tester 1 rotating, screw 83 moves in a planetary fashion around spool 55 and, hence, when head 84 is brought into engagement with one or the other of the stationary surfaces 57, head 84 rolls upon the contacting surface 57 and screw 83 is thus rotated. As will be hereinafter more fully described, the rotation of screw 83 is one of the manipulations necessary to secure a test of balance by the tester 1.

Referring particularly to Fig. 7, a bracket 85 is mounted upon base plate 2 and secured thereto by rivets 86 or the like. This bracket 85 carries a bearing 87 in which one end of a screw 88 is journaled. A ball bearing assembly 89 is carried by frame member 38 and the opposite end portion of screw 88 is journaled therein. Within frame member 38, a conical head 90 is carried upon the end of screw 88, said head being normally disposed between and spaced from the conical surfaces 47 of spool 46.

As has been hereinbefore described, spool 46 is carried upon sleeve 45 and said sleeve is axially slidable within bearing 42 and with respect to sleeve 50. Hence, by axially moving the spool inwardly or outwardly by the manipulation of knob 48, one or the other of the surfaces 47 may be brought into frictional contact with head 90 and in a fashion similar to the rotation of screw 83, hereinbefore described, screw 88 may be rotated. The rotation of screw 88 is also a factor in employing the tester 1.

Referring particularly to Fig. 6, an internally threaded nut 91 is in threaded engagement with screw 83 and may be moved lengthwise by the rotation of said screw. A guide rod 92 is disposed in parallel spaced relationship to screw 83 and is supported at its opposite ends in bracket 79 and frame member 38, respectively. An extension 93 is carried by nut 91 and slidably embraces guide rod 92 whereby nut 91 is prevented from rotating with screw 83 when the latter is rotated and is constrained to move in a rectilinear path along the guide rod.

Referring particularly to Figs. 3 and 7, a nut 94 is in threaded engagement with screw 88 and may be moved lengthwise of screw 88 by rotating said screw. A guide rod 95 is disposed in spaced parallel relationship to screw 88 and is supported at its respective ends by bracket 85 and frame member 38. Nut 94 carries an extension, similar to extension 93, which slidably embraces guide rod 95 and prevents rotation of the nut with the screw 88.

Figure 4:
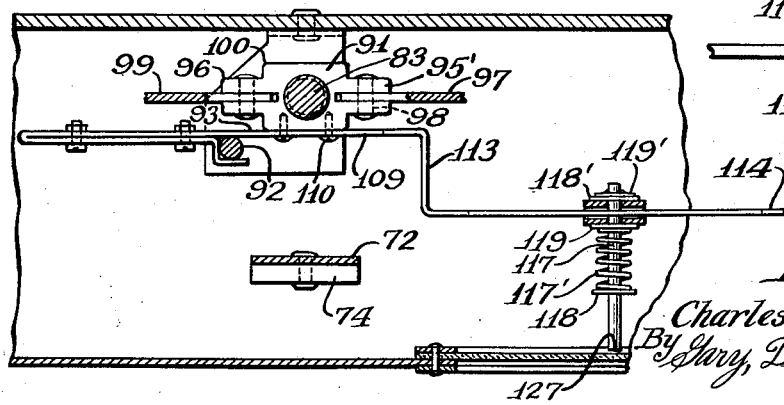
Fig. 4 is a slightly enlarged detailed sectional view of the device taken on line 4—4 of Fig. 3.

Referring particularly to Fig. 4, nut 91 carries oppositely extending flanges 95' and 96. A link 97 is pivotally connected by means of rivet 98 to flange 95', and in similar fashion link 99 is pivotally connected by means of rivet 100 to flange 96. The opposite end of link 97 is pivotally connected, as at 101 (Fig. 3) to weight arm 66 and the opposite end of link 99 is pivotally connected as at 102 to weight arm 60.

The arrangement is such that when screw 83 is rotated, nut 91 will move longitudinally in one direction or the other parallel to the axis of the screw and in so moving the weight arms 60 and 66 will be swung about the bushings 65 and 59. It will be noted that the weight arms 60 and 66 move together, but in opposite angular directions.

Referring particularly to Fig. 3, nut 94 carries opposite flanges 103 and 104, similar to flanges 95' and 96 hereinbefore described. A link 105 is pivotally connected at one end to flange 103 and link 106 is pivotally connected, in similar fashion, to flange 104. The opposite end of link 105 is pivotally secured, as at 107, to weight arm 72 and the opposite end of link 106 is pivotally secured, as at 108, to weight arm 71.

With the movement of nut 94 along screw 88, the weight arms 71 and 72 are swung about the bearing 42 and sleeve 65 in a fashion similar to the swinging of weight arms 60 and 66. Similar to the movement of the weight arms 60 and 66, the weight arms 71 and 72 swing together but swing in opposite angular directions.

Figure 5:
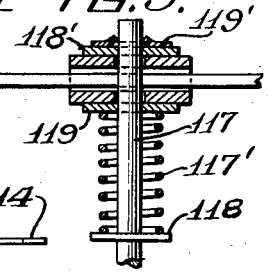
Fig. 5 is an enlarged detailed sectional view taken on line 5—5 of Fig. 3.

A connector 109, best shown in Figs. 3 and 4, is secured by means of screws 110 to nut 91. In similar fashion a connector 111 is secured to nut 94. The connector 109 is disposed in a direction substantially at right-angles to the axis of screw 83 and, in similar fashion, the connector 111 is disposed at substantially right-angles to the axis of screw 88. The connector 111 which extends from nut 94 is formed in U-shaped fashion, as shown best in Fig. 6, whereby a slot 112 is provided between the legs of the connector. The connector 109 carries an offset portion 113, Fig. 4, whereby the end portion 114 thereof is brought into substantially the plane of the slot 112 of connector 111 and the end portion 114 of connector 109 is threaded through the slot 112, as shown best in Figs. 4, 5 and 6.

The end portion 114 of connector 109 is provided with an elongated axial slot 115 and both legs of the U-shaped connector 111 are provided with elongated axial slots 116. An indicator pin 117 is threaded through each of the slots 115 and 116, said pin having an enlarged flange portion 118 carried intermediate the length of the pin on one side of one leg of connector 111, and a face washer 119 disposed and yieldably held against the same leg of the connector by coil spring 117' which embraces pin 117 between said washer and said flange portion. A second washer 118' is positioned upon that end of pin 117 which protrudes through slots 115 and 116, said washer being held in engagement with the other leg of connector 111 by a conventional slip-on spring fastener 119' or like fastening means.

The arrangement is such that the connectors 109 and 111 may move in rectilinear directions at right-angles to their respective slots 115 and 116 but pin 117 retains its position at the intersection of the two connectors. Hence, it can readily be understood that as the connectors 109 and 111 move in company with their supporting nuts 91 and 94 respectively, the indicator pin 117 will be moved in rectilinear or coordinate directions. As will be hereinafter more fully described, it is this movement of the indicator pin which indicates the degree of balance or unbalance of the wheel 12 when the device 1 is used for testing purposes.

As shown best in Figs. 1, 6, 7 and 8 the circular opening 120 is provided in the front face of the cover member 3, the center of said opening being offset with regard to the axial center of the device 1. A transparent dial 121 is positioned in the opening 120 and is secured to the cover 3 by means of bezel 122. The bezel 122 carries angularly spaced indicia 123 which may conveniently be similar to the hourly divisions of a conventional clock. The transparent dial 121 may be inscribed with a plurality of concentric circles 124 of increasing radius and indicia 125 may be employed to identify or designate the respective concentric circles. In addition, the dial may carry radially inscribed lines 126.

The device 1, together with the adapter 11 is normally in static and dynamic balance about its axis and when said condition of balance exists the nuts 91 and 94 will be disposed in a substantially central position upon the respective screws 83 and 88. When this condition of balance exists the end portion 127 (Fig. 3) of the indicator pin 117 will be positioned at the center of the dial 121, that is, at the zero position as determined by the indicia 125. Hence, when the screws 83 and 88 are rotated and the respective nuts 91 and 94 are moved axially along said screws, the indicator pin 127 will move beneath the dial 121 and its position may be readily determined by the concentric circles 124 and the radial lines 126 which are inscribed upon the dial 121.

A ring 128 may be secured to the face of the casing 3 and said ring may be concentric with respect to the axis of shaft 51. The ring 128 is also provided with angularly spaced indicia 129 which may correspond with the indicia upon the bezel 122. If desired, a relatively large ring 128' having indicia 129' corresponding to indicia 123 and 129, may be mounted upon the face of casing 3 in addition to, or as an alternate to ring 128. Likewise, ring 128'' having indicia 129'' may be mounted upon the lateral face of the casing to facilitate convenient reading of the weight position on the wheel.

It is to be understood, of course, that the angular divisions upon the bezel 122 and upon ring 128 may be selected as desired but in the selection of any angular units, it is preferred that the units used on both the bezel and the ring be the same. For convenience, the divisions of the hours on the usual clock are preferred.

To employ the device 1 in determining the condition of balance or unbalance of wheel 12, the wheel, being first raised from the ground, is rotated by, for instance, a conventional wheel spinner until the wheel acquires a relatively high speed. With the device 1 in normal balanced position per se, that is, with the end 127 of indicator pin 117 in zero position upon dial 121, if the wheel is unbalanced, the raised portion of the vehicle will vibrate. This vibration may be noted visually or tactually or a conventional vibration indicator may be used. Then either knob 54 or knob 48 may be grasped and either pushed or pulled and the increased or decreased vibration noted. If the vibration is decreased the other knob may be pushed or pulled and the result observed until the vibration is sensibly decreased. The first manipulated knob may again be manipulated in an attempt to secure a further decrease in vibration, and so on, until a desired substantially vibrationless condition is brought about.

It will be noted that when knob 54 is held and pushed or pulled, weight arms 60 and 66 will be swung toward each other in one direction or the other relative to their normal substantially diametral position, and in similar fashion weight arms 71 and 72 will be moved by the manipulation of knob 48. Thus the resultant of the forces of weights 61 and 67 and weights 73 and 74 will be secured in terms of the degree of movement of nuts 91 and 94, respectively. The resultants thus obtained will be at right-angles to each other, that is, along the axes of the screws 83 and 88.

However, by virtue of the relationship of the connectors 109 and 111 and pin 117, the pin 117 will move as a new resultant of the two above described resultants, the latter now being considered as quadrature components. The latter relationship can best be understood by reference to Figs. 8 and 9.

Figure 8:
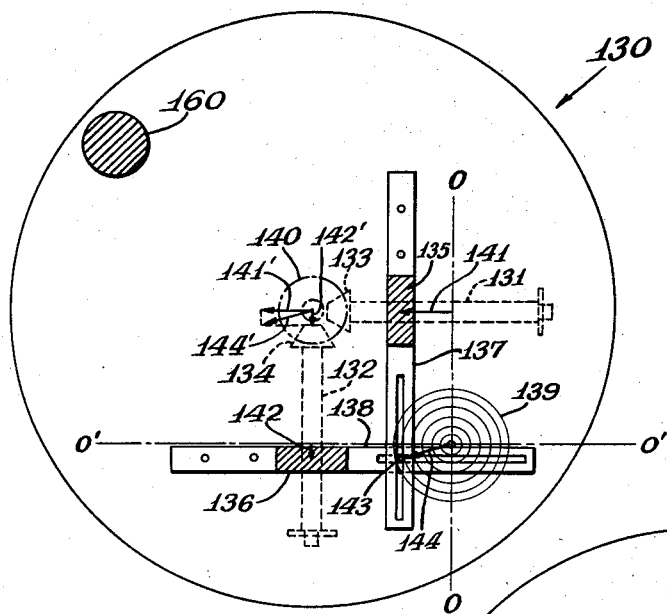
Fig. 8 is a diagrammatic face view of the device illustrating vectorily the operation of the device.

Referring particularly to Fig. 8, 130 indicates diagrammatically the balance testing device 1. Screw 88, hereinbefore described, is diagrammatically indicated by screw 131 and screw 83 is diagrammatically indicated by screw 132. Screw 131 carries a conical head 133 corresponding to head 90 and screw 132 carries conical head 134 corresponding to head 84. Nut 136 is threadedly engaged with screw 132 and corresponds to nut 91. Connector 137 is carried by nut 135 and corresponds to connector 111 and connector 138 is carried by nut 136 and corresponds to connector 109. The relative positions of dial 121 and ring 128 are indicated respectively by the reference numerals 139 and 140. For purposes of example, it may be assumed that the balance tester 130 is mounted upon a wheel which is unbalanced and that by the manipulations of knobs 54 and 48 as has been hereinbefore described, the entire rotating assembly comprising the wheel, adapter and testing device is brought to balance. For purposes of example, it is assumed that the screw 131 has been so manipulated as to move nut 135 to the position indicated in Fig. 8 and that this movement is indicated by vector 141, the movement being measured from the ordinate O—O. Further, it is assumed that in order to secure the desired balance the screw 132 has been so rotated as to move nut 136 through a distance represented by the vector 142, the vector being measured from the abscissa O'—O'. It will further be noted that the ordinate and abscissa intersect at the normal balanced position at the center of dial 121. The end of indicator pin 127 is indicated by the reference numeral 143 which has moved from the center of dial 139 to the position illustrated in Fig. 8.

The vector 141 comprises the resultant of the forces exerted by weights 73 and 74 and the vector 142 is the resultant of the forces exerted by the weights 61 and 67. Employing the resultants 141 and 142 as components, the resultant of said components is indicated by the vector 144.

Inasmuch as all of the forces mentioned act at the axis of the test instrument 130, a parallelogram of forces is indicated acting at the axis of the instrument, the parallelogram of forces comprises component 141' and component 142' and resultant 144'.

The position of pin 143 upon dial 139 may be readily located with reference to the radial lines 126 and the concentric circular lines 124 upon dial 121 and hence the resultant 144' may be located at the axis of the instrument by reference to the indicia upon the ring 128. The length of the vector 144 is determined by the concentric circles 124 and is indicated by the indicia 125. The indicia 125 may be calibrated in terms of weight and consequently the position of the pin 143 with reference to the calibrated circles 124 gives a measurement of the amount of unbalance of the wheel. By transposing the vector 144 to the position of vector 144' by reference to the indicia 123 and 129 the position of unbalance is indicated. The position of unbalance lies along the vector 144' and is diametrically opposite to said vector relative to the axis of the instrument.

Thus, the amount of unbalance is known and the position of unbalance is known and compensating weights may thereafter be mounted upon the wheel under test in the position indicated by the vector 144'.

Figure 9:
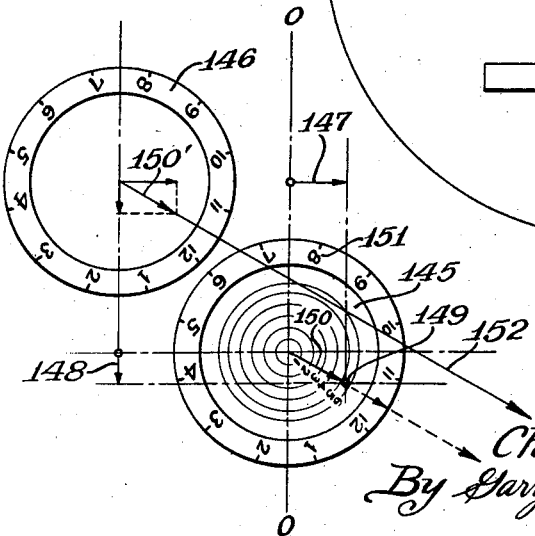
Fig. 9 is a diagrammatic view further showing vectorily the operation of the device.

Fig. 9 diagrammatically illustrates the indications which are obtained where the unbalance occurs at a different position upon the wheel. The dial 121 is indicated by the reference numeral 146. It will be noted that to secure the desired balance of the rotating assembly the weights 73 and 74 are so moved as to establish resultant 147 and the weights 61 and 67 are so moved as to establish resultant 148. The movement of pin 127 is indicated by the position of the corresponding pin 149, in other words, employing the resultants 147 and 148 as components, the pin 149 has moved through the distance indicated by the new resultant 150.

It will be noted that the new resultant 150 lies along a radial line substantially midway between 11 and 12 o'clock as indicated by indicia 151 corresponding to indicia 123. Transposing the resultant 150 to the position of the resultant 150' the line 152 will be located as lying between 11 and 12 o'clock upon the ring 146.

Hence, the amount of unbalance is measured by the length of the vector 150 as determined by the concentric circles and the direction of unbalance lies along the line 152 in a direction diametrically opposite to vector 150'.

Thus, it can readily be understood that in employing the test instrument 1 the amount and location of unbalance of a rotating body may be directly obtained by the simple manipulation of the knobs 54 and 48.

Figure 10:
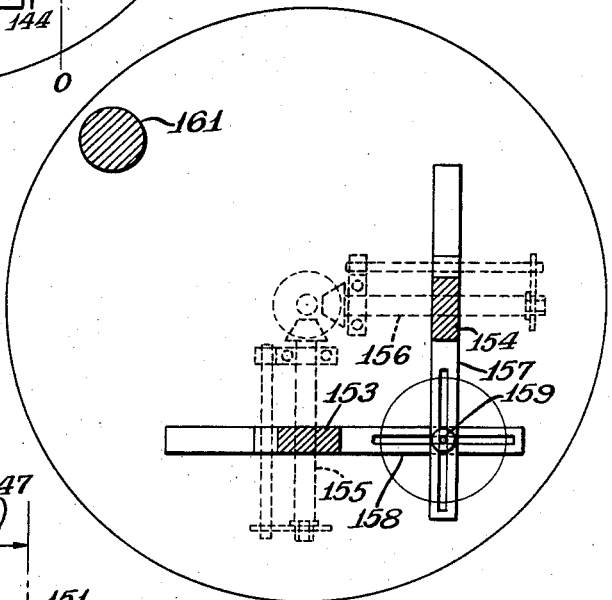
Fig. 10 is a diagrammatic view illustrating a modification of the invention.

Referring particularly to Fig. 10, a slight modification of the invention is shown diagrammatically. In the form of the invention illustrated in Fig. 10, the weight arms 60 and 66, weights 61 and 67, weight arms 71 and 72, and weights 73 and 74 are not used and in lieu thereof, the movable balancing weights comprise an integral part of nuts 153 and 154 which move respectively along screws 155 and 156. Otherwise, the device operates in substantially the same manner as has been hereinbefore described in conjunction with the preferred form of the invention. The nuts 154 and 155 which are of such size as to function as balancing weights are respectively secured to connectors 157 and 158 which at their point of intersection carry indicator pin 159.

The nut or weights 153 and 154, when the device is rotated with a rotatable body being tested, exert forces at right-angles to each other and may be represented by vectors, similar to vectors 141 and 142 or 147 and 148, and represent primary components, as opposed to the secondary components 141 and 142 or 147 and 148 which are actually the resultants of the forces produced by the weight arms and carried weights, hereinbefore described. The position of the indicator pin indicates the position and amount of unbalance as hereinbefore described.

In order to balance the testing device with pin 127 in its zero position, since the greater portion of the mass thereof is in the fourth quadrant, as shown best in Figs. 8 and 10, a weight 160 or 161 may be added to the device in the second quadrant, the weight 160 or 161 preferably being carried by the base 2 or casing 3. In order that the indicator pin may more readily be discerned through the transparent dial 121, the end 127 thereof may be painted with a luminous or bright colored paint.

It will be apparent that many unpatentable modifications and variations of the present invention may be made by any one skilled in the art, and, hence, it is not intended that the invention be limited to the exact details shown and described except as necessitated by the appended claims.

I claim as my invention:

1. A device for testing the balance of a rotatable body which comprises, a casing for securement to and for coaxial rotation with a rotatable body the balance of which is to be tested, two weight-moving members carried by, rotatable with, and radially disposed within said casing at substantially right-angles to each other, means carried by said casing for actuating said weight-moving members, a driven element engaged with each of said weight-moving members for movement radially along said weight-moving members when said members are actuated, weights connected to said driven elements and movable relative to the axis of said casing and in a plane at right-angles to said axis a distance proportional to the radial movement of said driven elements, a connector mounted upon each driven element and disposed at substantially right-angles to said respective weight-moving members and intersecting remotely from each driven element, an indicator carried by both connectors at the intersection thereof and movable with both connectors, dial means positioned on said casing adjacent said indicator, said dial means having radial and angular calibrations adjacent which said indicator moves when said weight-moving members move.

2. A device for testing the balance of a rotatable body which comprises, a casing for securement to and for rotation with a rotatable body the balance of which is to be tested, two axially rotatable screws carried by, rotatable with, and radially disposed within said casing at substantially right-angles to each other, means carried by said casing for axially rotating said screws, a threaded driven element threadedly engaged with each of said screws for movement lengthwise along said screws when said screws are rotated, weights connected to said driven elements and movable relative to the axis of said casing and in a plane at right-angles to said axis a distance proportional to the radial movement of said driven elements within said casing, a connector mounted upon each driven element and disposed at substantially right-angles to said respective screws and intersecting remotely from each driven element, an indicator carried by both connectors at the intersection thereof and movable with both connectors, dial means positioned on said casing adjacent said indicator, said dial means having radial and angular calibrations adjacent which said indicator moves when said screws are rotated.

3. A device for testing the balance of a rotatable body which comprises, a casing for securement to and for rotation with a rotatable body the balance of which is to be tested, two axially rotatable screws carried by, rotatable with, and radially disposed within said casing at substantially right-angles to each other, means carried by said casing for axially rotating said screws, a threaded driven element threadedly engaged with each of said screws for movement lengthwise along said screws when said screws are rotated, weights connected to said driven elements and movable relative to the axis of said casing and in a plane at right-angles to said axis a distance proportional to the radial movement of said driven elements within said casing, a connecter mounted upon each driven element and disposed at substantially right-angles to said respective screws and intersecting remotely from each driven element, each of said connectors being provided with an elongated axial slot adjacent the zone of intersection, an indicator carried in each slot of both connectors at the intersection thereof and movable with both connectors, dial means positioned on said casing adjacent said indicator, said dial means having radial and angular calibrations adjacent which said indicator moves when said screws are rotated.

4. A device for testing the balance of a rotatable body which comprises, a casing for securement to and for rotation with a rotatable body the balance of which is to be tested, two axially rotatable screws carried by, rotatable with, and radially disposed within said casing at substantially right-angles to each other, two shafts axially positioned for rotation in said casing, means carried by said shafts and said screws for engaging a respective shaft with a respective screw for selectively rotating axially said screws, a threaded driven element engaged with each of said screws for movement radially along the length of said screws when said screws are actuated, weights connected to said driven elements and movable relative to the axis of said casing and in a plane at right-angles to said axis a distance proportional to the radial movement of said driven elements, a connector mounted upon each driven element and disposed at substantially right-angles to each of said respective screws and intersecting remotely from each driven element, an indicator carried by both connectors at the intersection thereof and movable with both connectors, dial means positioned on said casing adjacent said indicator, said dial means having radial and angular calibrations adjacent which said indicator moves when said screws are axially rotated.

5. A device for testing the balance of a rotatable body which comprises, a casing for securement to and for rotation with a rotatable body the balance of which is to be tested, two axially rotatable screws carried by, rotatable with, and radially disposed within said casing at substantially right-angles to each other, two shafts axially positioned for rotation in said casing, friction engaging means carried by said shafts and said screws for engaging a respective shaft with a respective screw for selectively rotating axially said screws, a threaded driven element engaged with each of said screws for movement radially along the length of said screws when said screws are actuated, weights connected to said driven elements and movable relative to the axis of said casing and in a plane at right-angles to said axis a distance proportional to the radial movement of said driven elements, a connector mounted upon each driven element and disposed at substantially right-angles to each of said respective screws and intersecting remotely from each driven element, an indicator carried by both connectors at the intersection thereof and movable with both connectors, dial means positioned on said casing adjacent said indicator, said dial means having radial and angular calibrations adjacent which said indicator moves when said screws are axially rotated.

6. A device for testing the balance of a rotatable body which comprises, a casing for securement to and for rotation with a rotatable body the balance of which is to be tested, two axially rotatable screws carried by, rotatable with, and radially disposed within said casing at substantially right-angles to each other, concentric shaft members freely rotatably disposed within said casing, friction means carried by said shaft members and said screws for axially rotating said screws, a threaded driven element threadedly engaged with each of said screws for radial movement axially along said screws when said screws are axially rotated, weights connected to said driven elements and movable relative to the axis of said casing and in a plane at right-angles to said axis a distance proportional to the radial movement within said casing of said driven elements, a connector mounted upon each driven element and disposed at substantially right-angles to said respective screws and intersecting remotely from each driven element, each of said connectors being provided with an elongated slot adjacent the zone of intersection, an indicator carried in both connector slots at the intersection thereof and movable with both connectors, dial means positioned on said casing adjacent said indicator, said dial means having radial and angular calibrations adjacent which said indicator moves when said screws are axially rotated.

7. A device for testing the balance of a rotatable body which comprises, a casing for securement to and for coaxial rotation with a rotatable body the balance of which is to be tested, two axially rotatable screws carried by, rotatable with, and radially disposed in said casing at substantially right-angles to each other, means carried by said casing for selectively controlling the axial rotation of the respective screws, a nut threadedly mounted on each screw for translatory movement along said screw when it is axially rotated, two pairs of weight arms rotatably mounted in said casing, the weight arms of each pair being disposed at right-angles to the axis of rotation of said casing and being independently rotatable about said axis and each pair of weight arms being transverse to the other pair, means connecting each nut to a respective pair of weight arms to rotate the weight arms of each pair together but in opposite angular directions when said nut moves, a connector mounted upon each nut and movable therewith and disposed at substantially right-angles to the respective screws, said connectors intersecting remotely from said nuts, an indicator carried by both connectors at the intersection thereof and movable with both connectors, dial means positioned on said casing adjacent said indicator, said dial means having radial and angular calibrations adjacent which said indicator moves when said screws axially rotate.

8. A device for testing the balance of a rotatable body which comprises, a casing for securement to and for coaxial rotation with a rotatable body the balance of which is to be tested, two axially rotatable screws carried by, rotatable with, and radially disposed in said casing at substantially right-angles to each other, means carried by said casing for selectively controlling the axial rotation of the respective screws, said means comprising two coaxial shafts freely rotatably disposed axially in said casing, said shafts being axially movable relative to said casing and with respect to each other, engaging means carried by each of said shafts and cooperative engaging means carried by each screw whereby axial movement of each shaft causes engagement of said respective engaging means to cause aixal rotation of a respective screw, a nut threadedly mounted on each screw for translatory movement along said screw when it is axially rotated, two pairs of weight arms rotatably mounted in said casing, the weight arms of each pair being disposed at right-angles to the axis of rotation of said casing and being independently rotatable about said axis, and each pair of weight arms being transverse to the other pair, means connecting each nut to a respective pair of weight arms to rotate the weight arms of each pair together but in opposite angular directions when said nut moves, a connector mounted upon each nut and movable therewith and disposed at substantially right-angles to the respective screws, said connectors intersecting remotely from said nuts, an indicator carried by both connectors at the intersection thereof and movable with both connectors, dial means positioned on said casing adjacent said indicator, said dial means having radial and angular calibrations adjacent which said indicator moves when said screws axially rotate.

9. A device for testing the balance of a rotatable body which comprises, a casing for securement to and for coaxial rotation with a rotatable body the balance of which is to be tested, two axially rotatable screws carried by, rotatable with, and radially disposed in said casing at substantially right-angles to each other, means carried by said casing for selectively controlling the axial rotation of the respective screws, a nut threadedly mounted on each screw for translatory movement along said screw when it is axially rotated, two pairs of weight arms rotatably mounted in said casing, the weight arms of each pair being disposed at right-angles to the axis of rotation of said casing and being independently rotatable about said axis, and each pair of weight arms being transverse to the other pair, a link connecting each nut to a weight arm of each pair on opposite sides of the axis of rotation of said weight arms to rotate the weight arms of each pair together but in opposite angular directions when the nut moves, a connector mounted upon each nut and movable therewith and disposed at substantially right-angles to the respective screws, said connectors intersecting remotely from said nuts, an indicator carried by both connectors at the intersection thereof and movable with both connectors, dial means positioned on said casing adjacent said indicator, said dial means having radial and angular calibrations adjacent which said indicator moves when said screws axially rotate.

10. A device for testing the balance of a rotatable body which comprises, a casing for securement to and for coaxial rotation with a rotatable body the balance of which is to be tested, two axially rotatable screws carried by, rotatable with, and radially disposed in said casing at substantially right-angles to each other, means carried by said casing for selectively controlling the axial rotation of the respective screws, a nut threadedly mounted on each screw for translatory movement along said screw when it is axially rotated, two pairs of weight arms rotatably mounted in said casing, the weight arms of each pair being disposed at right-angles to the axis of rotation of said casing and being independently rotatable about said axis, and each pair of weight arms being transverse to the other pair, means connecting each nut to a respective pair of weight arms to rotate the weight arms of each pair together but in opposite angular directions when the nut moves, a connector mounted upon each nut and movable therewith and disposed at substantially right-angles to the respective screws, said connectors intersecting remotely from said nuts, each of said connectors being provided with an elongated slot adjacent the zone of intersection, an indicator pin carried in the slots of both connectors at the intersection thereof and movable with both connectors, dial means positioned on said casing adjacent said indicator, said dial means having radial and angular calibrations adjacent which said indicator moves when said screws axially rotate.

11. A device for testing the balance of a rotatable body which comprises, a casing for securement to and for coaxial rotation with a rotatable body the balance of which is to be tested, a frame member carried by said casing and movable therewith, two screws journaled in said frame member for free axial rotation and radially disposed in said casing at substantially right-angles to each other, said screws being movable in planetary fashion with said casing, friction means carried in said casing for selectively controlling the axial rotation of the respective screws, a nut threadedly mounted on each screw for translatory movement along said screw when it is axially rotated, two pairs of weight arms rotatably mounted in said casing, the weight arms of each pair being disposed at right-angles to the axis of rotation of said casing and being independently rotatable about said axis, and each pair of weight arms being transverse to the other pair, means connecting each nut to a respective pair of weight arms to rotate the weight arms of each pair together but in opposite angular directions when the nut moves, a connector mounted upon each nut and movable therewith and disposed at substantially right-angles to the respective screws, said connectors intersecting remotely from said nuts, an indicator carried by both connectors at the intersection thereof and movable with both connectors, dial means positioned on said casing adjacent said indicator said dial means having radial and angular calibrations adjacent which said indicator moves when said screws axially rotate.

References Cited in the file of this patent

UNITED STATES PATENTS

| | | |
|---|---|---|
| 1,422,224 | Poole | July 11, 1922 |
| 1,743,239 | Ross | Jan. 14, 1930 |
| 2,731,833 | Jones | Jan. 24, 1956 |
| 2,779,196 | Hemmeter | Jan. 29, 1957 |
| 2,780,939 | Kellogg | Feb. 12, 1957 |